(12) United States Patent
Combs et al.

(10) Patent No.: US 9,804,852 B2
(45) Date of Patent: Oct. 31, 2017

(54) CONDITIONAL EXECUTION SUPPORT FOR ISA INSTRUCTIONS USING PREFIXES

(75) Inventors: Jonathan D. Combs, Austin, TX (US); Jason W. Brandt, Austin, TX (US); Robert Valentine, Kiryat Tivon (IL); Kevin B. Smith, Hillsboro, OR (US); Zia Ansari, Durham, OR (US); Maxim Loktyukhin, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 13/976,230

(22) PCT Filed: Nov. 30, 2011

(86) PCT No.: PCT/US2011/062673
§ 371 (c)(1),
(2), (4) Date: Jun. 26, 2013

(87) PCT Pub. No.: WO2013/081607
PCT Pub. Date: Jun. 6, 2013

(65) Prior Publication Data
US 2013/0275723 A1    Oct. 17, 2013

(51) Int. Cl.
*G06F 9/30* (2006.01)
(52) U.S. Cl.
CPC ........ *G06F 9/3016* (2013.01); *G06F 9/30072* (2013.01); *G06F 9/30094* (2013.01); *G06F 9/30185* (2013.01)
(58) Field of Classification Search
CPC ................................................... G06F 9/3016
USPC ........................................................ 712/226
See application file for complete search history.

(56) References Cited

U.S. PATENT DOCUMENTS

| 5,303,358 | A | * | 4/1994 | Baum | G06F 9/3001 |
| | | | | | 712/226 |
| 5,768,574 | A | * | 6/1998 | Dutton | G06F 9/30094 |
| | | | | | 711/206 |
| 5,822,778 | A | * | 10/1998 | Dutton | G06F 9/30116 |
| | | | | | 711/208 |

(Continued)

FOREIGN PATENT DOCUMENTS

| CN | 1187255 A | 7/1998 |
| CN | 1414466 A | 4/2003 |

(Continued)

OTHER PUBLICATIONS

PCT Written Opinion of the International Searching Authority for counterpart PCT Application No. PCT/US2011/062673, 4 pgs., (dated Jul. 23, 2012).

(Continued)

*Primary Examiner* — Andrew Caldwell
*Assistant Examiner* — Michael Metzger
(74) *Attorney, Agent, or Firm* — Nicholson DeVos Webster & Elliott LLP (57) ABSTRACT

In one embodiment, a processor includes an instruction decoder to receive a first instruction having a prefix and an opcode and to generate, by an instruction decoder of the processor, a second instruction executable based on a condition determined based on the prefix, and an execution unit to conditionally execute the second instruction based on the condition determined based on the prefix.

18 Claims, 10 Drawing Sheets

(56) References Cited

U.S. PATENT DOCUMENTS

| | | | |
|---|---|---|---|
| 6,009,512 A * | 12/1999 | Christie | G06F 9/30072 |
| | | | 712/218 |
| 6,014,735 A | 1/2000 | Chennupaty et al. | |
| 6,260,134 B1 * | 7/2001 | Zuraski, Jr. | G06F 9/30152 |
| | | | 712/204 |
| 7,155,598 B2 * | 12/2006 | Henry | G06F 9/30174 |
| | | | 712/219 |
| 2004/0153885 A1 * | 8/2004 | Chauvel | G06F 9/30069 |
| | | | 714/54 |
| 2009/0172356 A1 * | 7/2009 | Valentine | G06F 9/30149 |
| | | | 712/208 |
| 2010/0332803 A1 | 12/2010 | Yoshida et al. | |

FOREIGN PATENT DOCUMENTS

| | | |
|---|---|---|
| CN | 101533342 A | 9/2009 |
| EP | 2065826 A2 | 9/2009 |

OTHER PUBLICATIONS

PCT Notification concerning Transmittal of International Preliminary Report on Patentability (Chapter I of the Patent Cooperation Treaty) for counterpart PCT Application No. PCT/US2011/062673, 6 pgs., (dated Jun. 12, 2014).

International Search Report dated Jul. 23, 2012, for International Application No. PCT/US2011/062673, 9 pages.

Office action with summarized English translation from Taiwan Patent Application No. 101141797, dated Mar. 18, 2015, 9 pages.

Office action and Search Report with English translation of Search Report from Chinese Patent Application No. 201180075225.8, dated Aug. 26, 2015, 16 pages.

Office action and Search Report with English translation of Search Report from Chinese Patent Application No. 201180075225.8, dated Jun. 12, 2016, 20 pages.

* cited by examiner

| tttn | Mnemonic | Condition |
|---|---|---|
| 0000 | O | Overflow |
| 0001 | NO | No overflow |
| 0010 | B, NAE | Below, Not above or equal |
| 0011 | NB, AE | Not below, Above or equal |
| 0100 | E, Z | Equal, Zero |
| 0101 | NE, NZ | Not equal, Not zero |
| 0110 | BE, NA | Below or equal, Not above |
| 0111 | NBE, A | Not below or equal, Above |
| 1000 | S | Sign |
| 1001 | NS | Not sign |
| 1010 | P, PE | Parity, Parity Even |
| 1011 | NP, PO | Not Parity, Parity Odd |
| 1100 | L, NGE | Less than, Not greater than or equal to |
| 1101 | NL, GE | Not less than, Greater than or equal to |
| 1110 | LE, NG | Less than or equal to, Not greater than |
| 1111 | NLE, G | Not less than or equal to, Greater than |

FIG. 6
(Prior Art)

| ccccL | Mnemonic | Conditional Execution | Flag Non-Modifying |
|---|---|---|---|
| 0000 | {O} | Overflow | TRUE |
| 0001 | {NO} | No overflow | TRUE |
| 0010 | {B}, {NAE} | Below, Not above or equal | TRUE |
| 0011 | {NB}, {AE} | Not below, Above or equal | TRUE |
| 0100 | {E}, {Z} | Equal, Zero | TRUE |
| 0101 | {NE}, {NZ} | Not equal, Not zero | TRUE |
| 0110 | {BE}, {NA} | Below or equal, Not above | TRUE |
| 0111 | {NBE}, {A} | Not below or equal, Above | TRUE |
| 1000 | {S} | Sign | TRUE |
| 1001 | {NS} | Not sign | TRUE |
| 1010 | {UNC} (optional) | Unconditional | FALSE |
| 1011 | {UNC} (optional) | Unconditional | TRUE |
| 1100 | {L}, {NGE} | Less than, Not greater than or equal to | TRUE |
| 1101 | {NL}, {GE} | Not less than, Greater than or equal to | TRUE |
| 1110 | {LE}, {NG} | Less than or equal to, Not greater than | TRUE |
| 1111 | {NLE}, {G} | Not less than or equal to, Greater than | TRUE |

CONDITIONAL EXECUTION SUPPORT FOR ISA INSTRUCTIONS USING PREFIXES

CROSS-REFERENCE TO RELATED APPLICATION

This patent application is a U.S. National Phase Application under 35 U.S.C. §371 of International Application No. PCT/US2011/062673, filed Nov. 30, 2011, entitled CONDITIONAL EXECUTION SUPPORT FOR ISA INSTRUCTIONS USING PREFIXES.

FIELD OF THE INVENTION

Embodiments of the present invention relate generally to instruction processing apparatuses. More particularly, embodiments of the invention relate to an instruction processing apparatus with conditional execution extension for ISA instructions using prefixes.

BACKGROUND

Instructions involved in a general purpose register (GPR) such as integer registers are widely used in instruction set architectures (ISA) such as x86 architecture. Most x86 GPR (e.g., integer registers other than x87 or single instruction multiple data (SIMD)/advanced vector extension (AVX) registers) operations write to an integer register as well as manipulate an x86 arithmetic flag register. For example, an addition instruction such as ADD instruction modifies a flag (e.g., OF, SF, ZF, AF, CF, and PF flags) and updates a GPR destination. An increment instruction such as INC also modifies a flag (e.g., OF, SF, ZF, AF, and PF) and updates a GPR destination. Often, this flag modification is unnecessary and yet adds complexity and potential performance implications due to unnecessary dependency chains.

An instruction can also be conditionally executed by a processor based on one or more conditions. Typically, x86 GPR instructions require multiple opcodes or instructions in order to perform a conditional execution, for example, based on one or more test fields as shown in a condition code table in FIG. 6. Such a requirement may consume more resources and reduce the performance of a processor.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an instruction received at a processor includes a prefix and an opcode. One or more bits of the prefix of the instruction are utilized to indicate one or more conditions, which when satisfied, cause the opcode of the instruction to be executed. Different bit patterns of the prefix may be utilized to specify different conditions for conditional execution of the opcode. The opcode of the instruction may represent an integer general purpose register (GPR) or memory instruction such as an x86 compatible opcode (e.g., x86 legacy opcodes). As a result, a single instruction can include information specifying one or more conditions of conditional execution of an opcode.

In addition, according to one embodiment, a prefix of an instruction is also utilized to provide an indication whether a flag of a register should be modified when executing an opcode of the instruction by a processor. In one embodiment, when an instruction is received at a processor, processing logic such as an instruction decoder, is configured to examine a bit pattern of one or more bits of a prefix to determine whether an opcode of the instruction, which when being executed, should be allowed to modify a flag of a register such as a flag register, a status register, or a condition code register, etc. If the bit pattern matches a predetermined pattern, an execution unit executing the opcode is prevented from modifying a flag that would normally be modified by the execution of the opcode.

In one embodiment, a bit pattern of a prefix of the instruction can be utilized to indicate: 1) one or more conditions which determine whether the opcode of the instruction will be executed; and 2) whether the conditional execution of the opcode will be allowed to modify one or more flags of a register such as a flag register, a status register, and/or a condition code register, etc. Thus, a single instruction having a prefix and an opcode can include all of the information in the prefix to determine one or more conditions for conditionally executing the opcode and/or whether the conditional execution of the opcode can modify one or more flags of a register.

Figure 1:
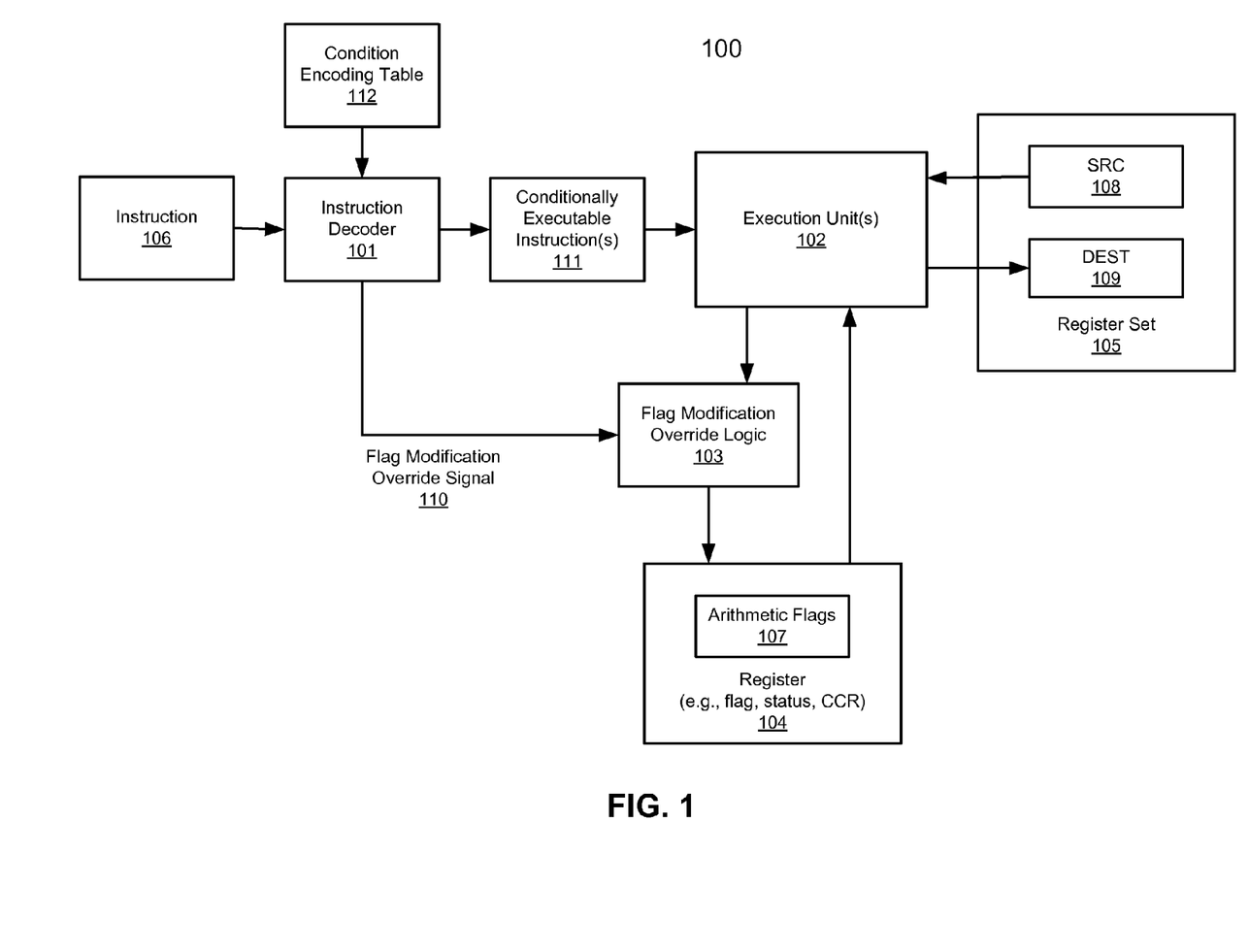
FIG. 1 is a block diagram illustrating an example of a processor according one embodiment.

FIG. 1 is a block diagram illustrating an example of a processor according one embodiment. Referring to FIG. 1, processor 100 may represent any kind of instruction processing apparatuses. For example, processor 101 may be a general-purpose processor. Processor 100 may be any of various complex instruction set computing (CISC) processors, various reduced instruction set computing (RISC) processors, various very long instruction word (VLIW) processors, various hybrids thereof, or other types of processors entirely. In one embodiment, processor 100 includes instruction decoder 101 to receive and decode instruction 106. Instruction decoder 101 may generate and output one or more micro-operations, micro-code, entry points, microinstructions, other instructions, or other control signals, which reflect, or are derived from, instruction 106. Instruction decoder 101 may be implemented using various different mechanisms. Examples of suitable mechanisms include, but are not limited to, microcode read only memories (ROMs), look-up tables, hardware implementations, programmable logic arrays (PLAs), and the like.

Processor 100 further includes one or more execution units 102, which may include an arithmetic logic unit, or another type of logic unit capable of performing operations based on instruction 106. As a result of instruction decoder 101 decoding instruction 106, execution unit 102 may receive one or more micro-operations, micro-code entry points, microinstructions, other instructions, or other control signals, which reflect, or are derived from, instruction 106. Execution unit 102 may be operable as a result of instruction 106 indicating one or more source operands (SRC) 108 and to store a result in one or more destination operands (DEST) 109 of register set 105 indicated by instruction 106. Execution unit 102 may include circuitry or other execution logic (e.g., software combined with hardware and/or firmware) operable to execute instructions or other control signals derived from instruction 106 and perform an operation accordingly. Execution unit 102 may represent any kinds of execution units such as logic units, arithmetic logic units (ALUs), arithmetic units, integer units, etc.

In one embodiment, instruction 106 may implicitly indicate and/or explicitly specify (e.g., through one or more dedicated fields or sets of bits) the source and destination operands. Examples of suitable sources and/or destination of the operands include registers, memory, immediate of the instruction, and combinations thereof. In various embodiments, the source and destination operands may be 8-bit, 16-bit, 32-bit, or 64-bit operands, although this is not required.

In one embodiment, some or all of the source and destination operands may be stored in registers of a register set 105 or memory. The register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

Figure 2:
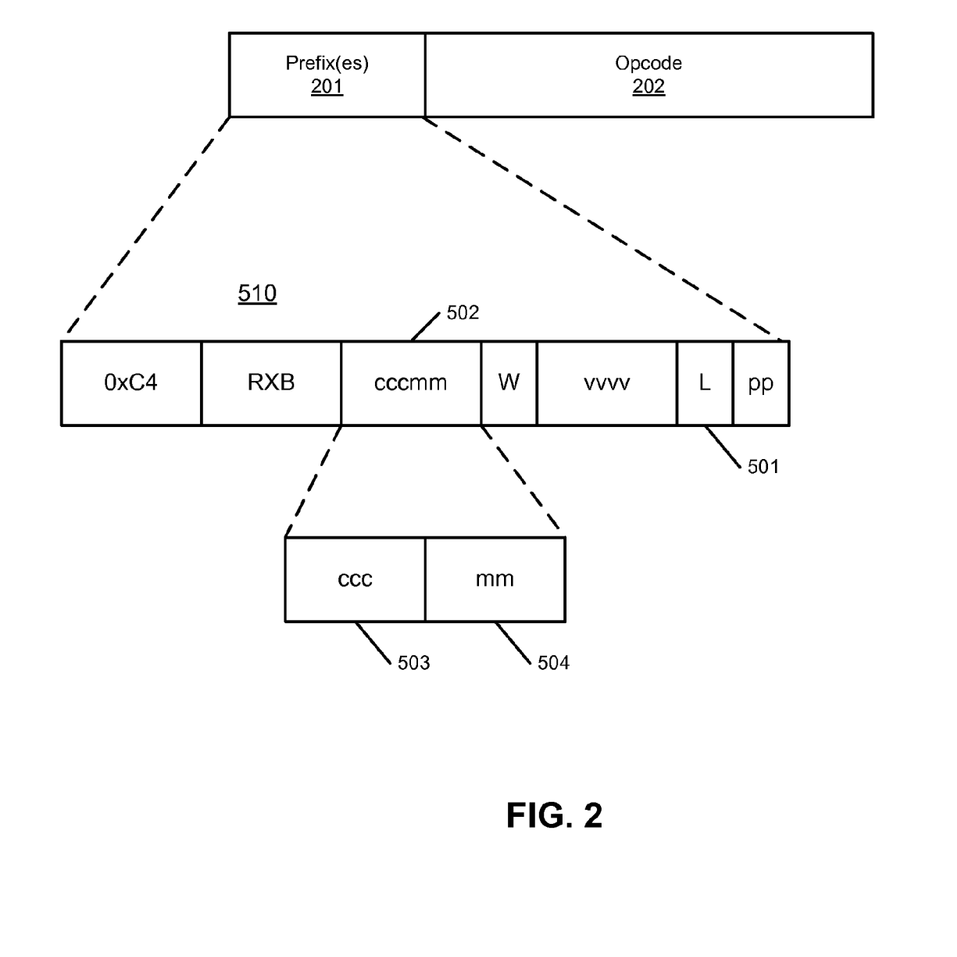
FIG. 2 is a block diagram illustrating an example of an instruction according to one embodiment.

Referring back to FIG. 1, in one embodiment, instruction 106 may include at least one prefix and an opcode as shown in FIG. 2. Referring to FIGS. 1 and 2, instruction 200 of FIG. 2 may represent instruction 106 of FIG. 1. In one embodiment, instruction 200 includes prefix 201 and opcode 202. When instruction 200 is received by instruction decoder 101, according to one embodiment, instruction decoder 101 is configured to generate one or more microcode operations or microinstructions based on opcode 202 to be executed by execution unit 102. In addition, instruction decoder 101 is configured to examine one or more bits of prefix 201 to determine one or more conditions upon which the microcode operations or microinstructions associated with opcode 202 should be executed by execution unit 102. Furthermore, instruction decoder 101 is configured to examine one or more bits of prefix 201 to determine whether execution unit 102 can modify at least one of flags 107 of register 104 as a result of execution (e.g., conditional execution) of the microcode operations or microinstructions.

In one embodiment, when instruction 106 is received by instruction decoder 101, instruction decoder 101 is configured to extract the prefix such as prefix 201 of FIG. 2 from instruction 106. Instruction decoder 101 is then to determine a condition upon which the opcode of instruction 106 is to be executed based on the prefix. In one embodiment, the condition is determined by looking up condition encoding table 112, which maps certain prefixes to certain conditions. Different bit patterns of the prefixes may represent different conditions. Condition encoding table 112 may be implemented in hardware, firmware, software, or a combination thereof. Based on the condition or conditions derived from the prefix, instruction decoder 101 is configured to generate one or more conditional executable microcode operations or microinstructions 111 to be conditionally executed by execution unit 102.

In addition, instruction decoder 101 further examines the prefix of instruction 106 to determine as a result of the conditional execution whether execution unit 102 is allowed to modify any of flags 107 of register 104. According to one embodiment, when a bit pattern of one or more bits of prefix 201 matches a predetermined pattern, instruction decoder 101 transmits a flag modification override (FMO) signal 110 to FMO logic 103. FMO logic 103 may prevent the flags from being modified for that operation. If the bit pattern of one or more bits of prefix 201 does not match the predetermined bit pattern, FMO logic 103 may allow execution unit 102 to modify flags 107. Information stored in prefix 201 and/or opcode 202 may be populated by a compiler and/or a programmer. FMO logic 103 may be implemented in hardware, firmware, software, or a combination thereof. Note that a particular bit pattern of prefix 201 may indicate that a particular flag can be modified while other flags may not be modifiable. Thus, the bit pattern of prefix 201 dictates which of the flags 107 can be modified by execution unit 102 and the condition or conditions which must be true for opcode 202 to be executed. As a result, a single instruction can specify both the condition and the indication whether to override the modification attempt to a flag. Conventional systems typically require multiple instructions or opcodes for conditional executions. Also note that the format of instruction 200 of FIG. 2 has been shown and described for the purpose of illustration only; other formats may also be applied.

Figure 3:
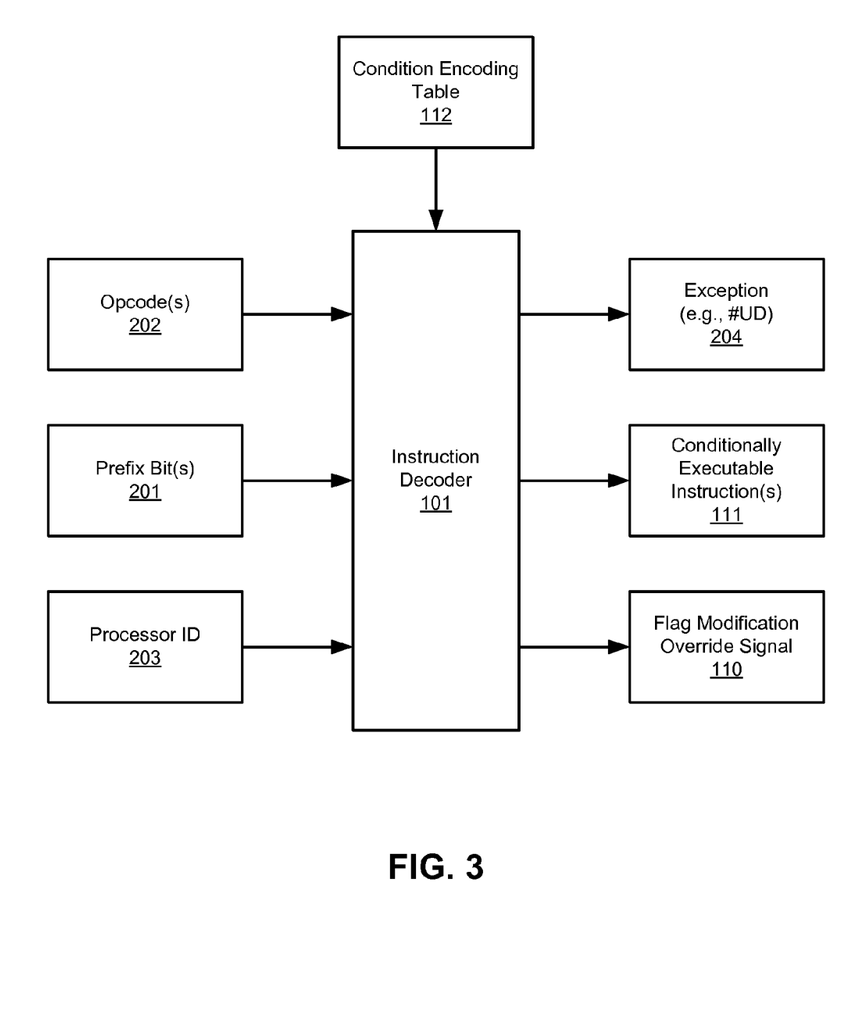
FIG. 3 is a block diagram illustrating an example of a processor according one embodiment.

In one embodiment, prior to generating microcode operations or microinstructions 111 from the opcode, instruction decoder 101 is configured to examine, given an opcode provided in opcode 202, whether prefix 201 having a particular bit pattern is valid. If it is determined that the prefix 201 is invalid based on opcode 202, an exception is generated and the opcode will not be executed. Furthermore, instruction decoder 101 may also examine whether instruction 200 is valid given a capability of processor 100, which may be determined based on a processor identifier such as a CPUID as shown in FIG. 3. Referring to FIG. 3, based on information such as prefix 201, opcode 202, and/or processor ID 203, instruction decoder 101 is configured to generate exception 204 (e.g., undefined or UD operation) if the instruction is determined to be invalid. Otherwise, instruction decoder 101 is configured to generate FMO signal 110 and conditional executable microcode operations or microinstruction(s) 111 based on prefix 201, opcode 202, and condition encoding table 112. Referring back to FIG. 1, based on FMO signal 110, FMO logic 103 is configured to control whether the flags 107 of register 104 or modified for that operation, where FMO logic 103 may or may not allow such a modification dependent upon the specific prefix of instruction 106.

Figure 4:
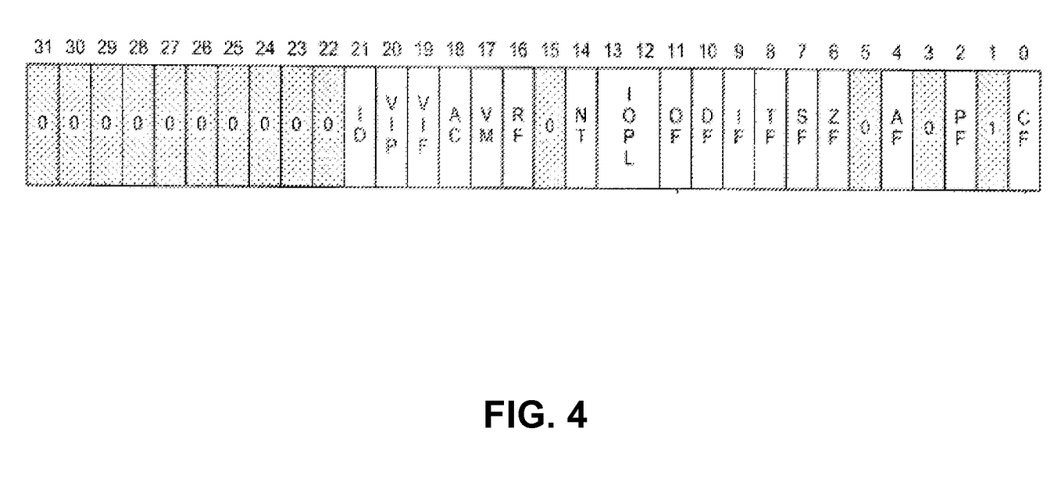
FIG. 4 is a block diagram illustrating an example of a flag register.

In one embodiment, flags 107 may represent one or more of arithmetic flags. Register 104 may be a status register, a flags register (e.g., EFLAGS), or a condition code register (CCR). An example of register 104 is shown in FIG. 4, which represents an example of the EFLAGS register. Flags 107 may include one or more bits, often in a register such as register 104. Flags 107 do not have to be bits in a register. A flag may include a flip-flop circuit. A bit flag may store a binary value, such as a binary one or a binary zero. The bits may store a sequence of binary values or a code. Such binary values, or sequences of binary values, may represent different values of the flag. These different values of the flag may have an assigned or understood meaning to processor 100 or other logic device. Flags 107 may be used for various different purposes. In some cases, flags 107 may be used to record a status, state, condition, or outcome of operations within processor 100 or other logic device. Flags 107 may include a carry flag (CF), an overflow flag (OF), a sign flag (SF), a zero flag (ZF), an auxiliary carry flag (AF), or a parity flag (PF), or a combination thereof, as shown in FIG. 4. Not all of such flags are included in all processors or other logic devices. Additionally, different names are sometimes used for these different flags.

According to one embodiment, instruction 106 is compatible with the advanced vector extension (AVX)-based ISA of Intel Corporation of Santa Clara, Calif. An embodiment utilizes an AVX prefix of an AVX-based instruction to encode a "flag non-modifying" indication to the ISA. Being done via a prefix allows this extension to be applied broadly to the existing legacy set of x86 GPR instruction opcodes. This can be applied to a variety of modes such as 16-bit, 32-bit, or 64-bit mode. By adding the flag non-modifying indication in the prefix space, embodiments allow a rich set of flag non-modifying instructions to be generated while utilizing mostly pre-existing legacy hardware with only slight modifications. In one embodiment, one or more AVX prefix bits are utilized to denote flag non-modification to any or all legacy integer instruction opcodes that write both an integer GPR or memory destination and update one or more arithmetic flag bits. Such a prefix prevents new opcodes and corresponding decoder hardware from being required whenever a flag non-modifying version of an existing legacy instruction is desired. In addition, according to one embodiment, the AVX prefixes can also be utilized to specify one or more conditions for conditional execution of certain instructions such as x86 integer GPR or memory instructions.

Figure 5:
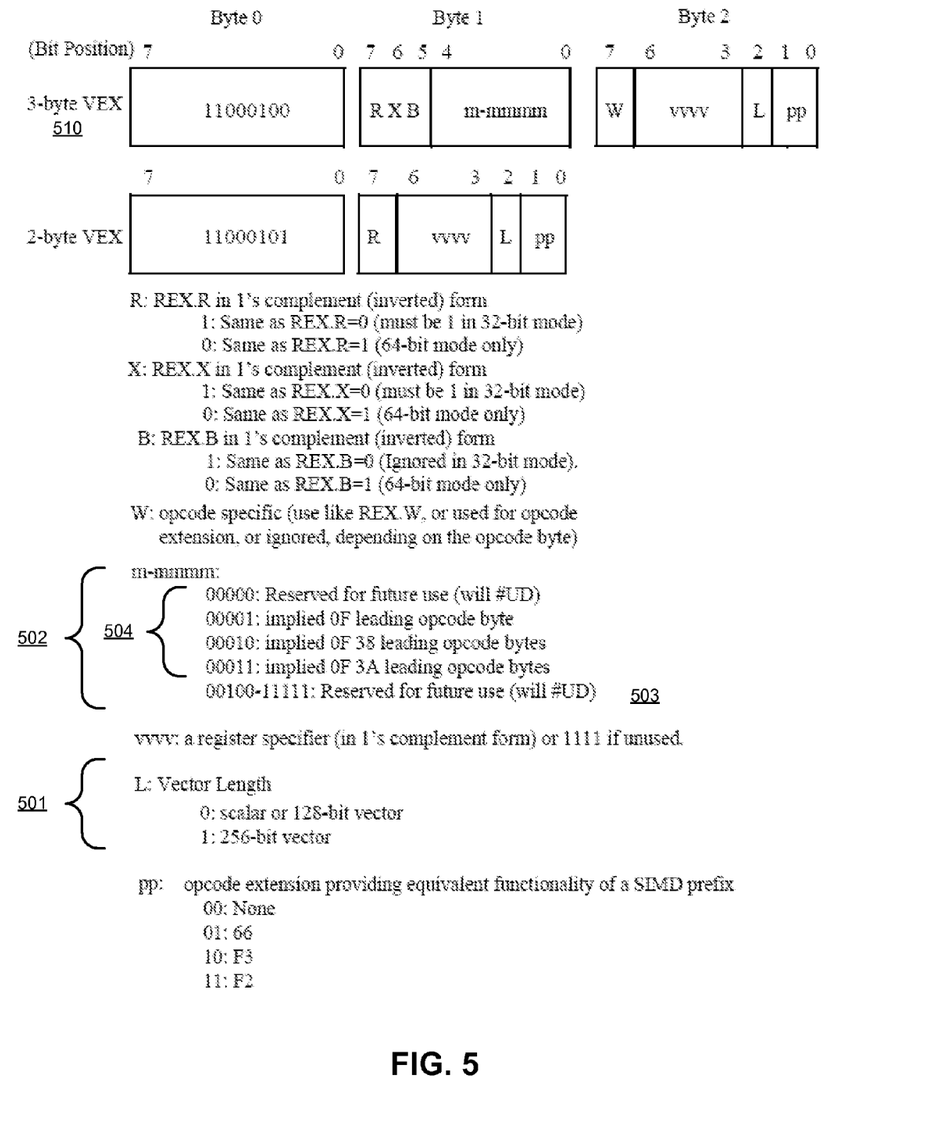
FIG. 5 is a block diagram illustrating VEX prefix encoding utilized with AVX-based instructions according to one embodiment.

FIG. 5 is a block diagram illustrating VEX prefix encoding utilized with AVX-based instructions according to one embodiment. Referring to FIG. 5, AVX-based prefixes include a 3-byte C4 VEX encoding 510, which may be implemented as part of prefix 201 of FIG. 2. According to one embodiment, a combination of multiple bits in the VEX prefix encoding may be utilized for conditional integer execution and flag non-modification extension. Referring back to FIG. 5, certain bits that are not utilized in typical vector instructions such as "mmmmm" bits 502 may be utilized to indicate whether a flag should be modified by an execution unit. In this embodiment, upper three bits 503 of bits 502 are not utilized while bits 504 are utilized in vector instructions. As a result, certain bit patterns of a combination of bits 503 and/or L bit 501 can be utilized to specify one or more conditions for conditional execution and to indicate whether a flag should be modified.

Figure 6:
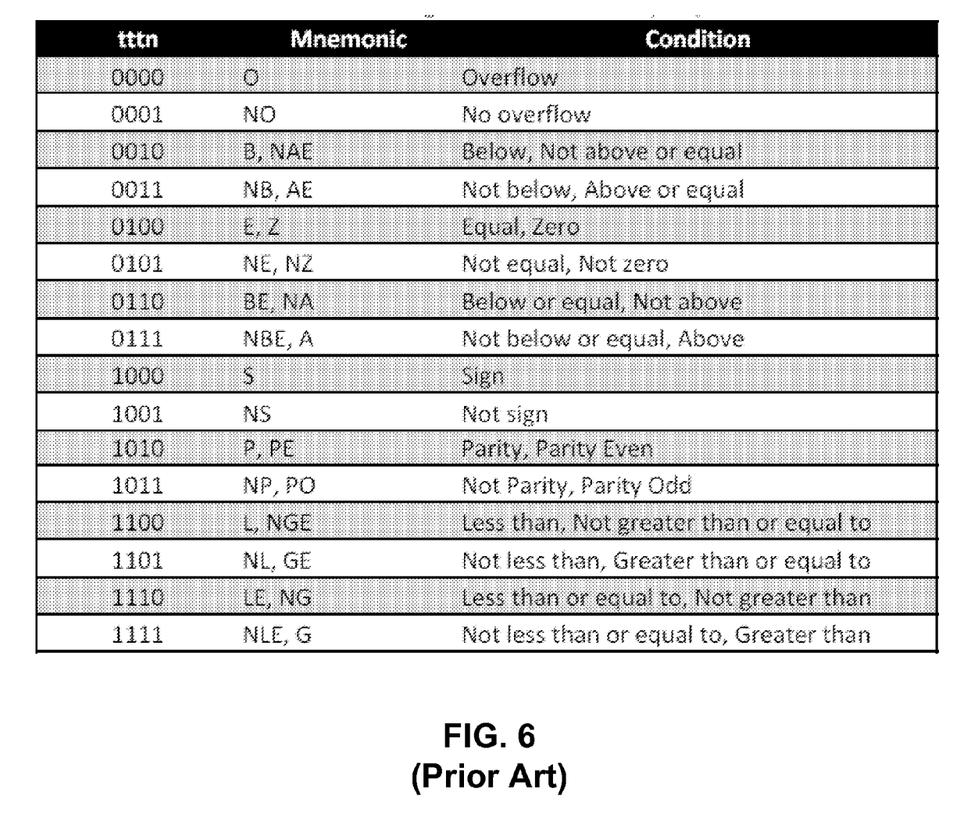
FIG. 6 is a block diagram illustrating a conventional condition code table.
Figure 7:
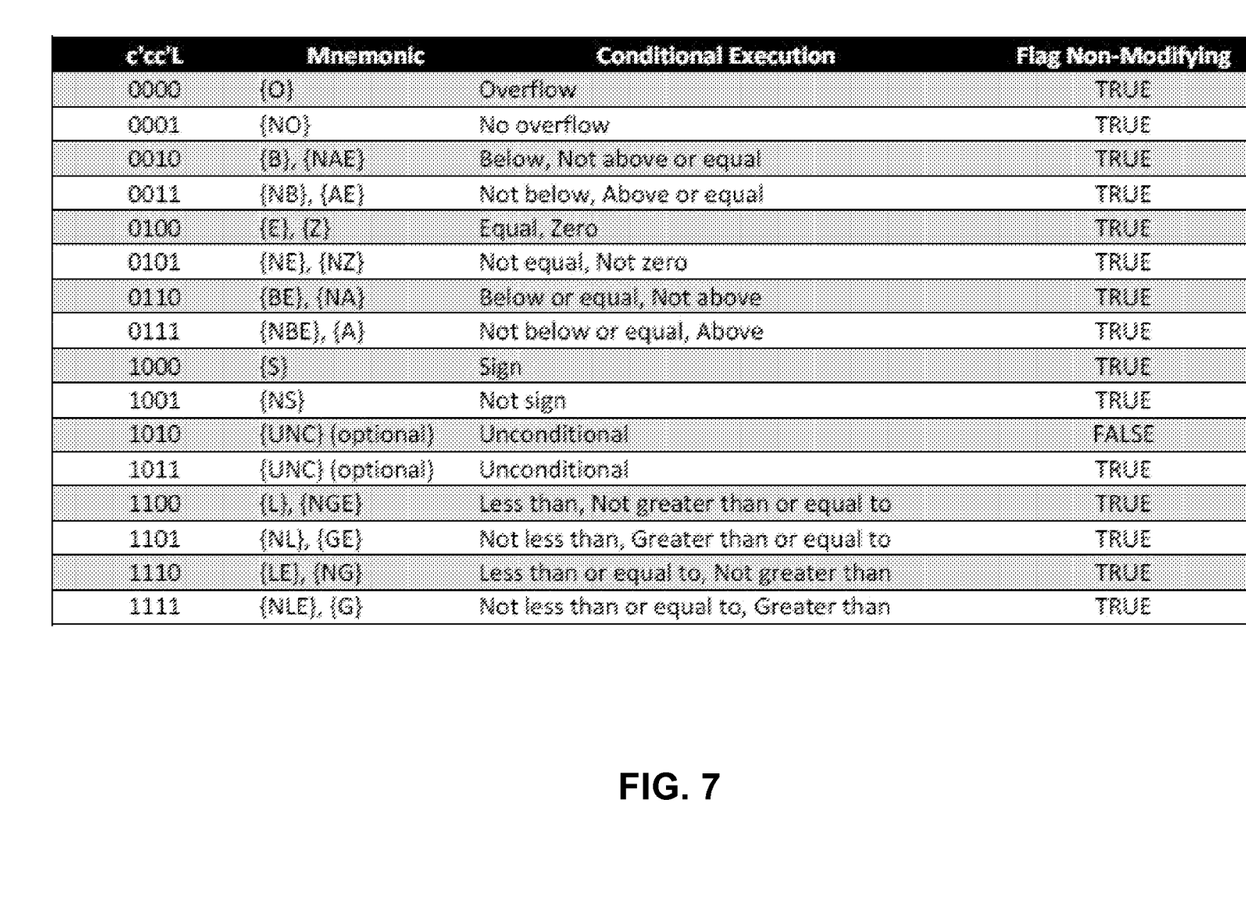
FIG. 7 is a block diagram illustrating a prefix encoding table according to one embodiment.

In one embodiment, bits 503 in combination of L bit 501 may also be utilized to specify one or more conditions for conditional execution and to indicate whether a flag should be modified, as shown in FIG. 2. The combined bit patterns of bits 503 and L bit 501 are utilized to represent various conditions for conditional executions as shown in FIG. 7, which may represent condition encoding table 112 of FIG. 1. The condition encoding table as shown in FIG. 7 represents most of the conditions in a legacy condition code table as shown in FIG. 6 that typically requires multiple instructions or opcodes. In this embodiment, three currently reserved bits 503 in C4 AVX prefix 510 along with L bit 501 are utilized to enable the existing GPR x86 opcode space with the capability to support a rich set of conditional execution options and flag non-modification, and to take advantage of the existing ternary abilities VEX provides. In one embodiment, the flag non-modification override applies only to instructions that update both a GPR register and a flag register; it may not apply to instructions that modify only the flag register.

X86 instructions that utilize condition codes as shown in FIG. 6 consume four bits to specify the conditions that are used to evaluate the x86 arithmetic flags. An embodiment of the invention is to replicate the conditions as shown in FIG. 6 for conditional execution behavior by consuming three currently reserved bits in the C4 VEX encoding and repurposing the L bit in the C4 VEX encoding to enable nearly all the same conditions present in the legacy conditional test fields as shown in FIG. 6. The "ccc" bits are currently reserved in a conventional system and non-zero values will cause a fault (e.g., #UD). A non-zero value for L in the convention system for the new integer GPR instructions that utilize VEX will cause a fault. With this extension, according to one embodiment, these bits would take on meaning for those integer GPR instructions that can be extended. The encodings can be resolved based on the encoding table as shown in FIG. 7.

In one embodiment, x86 legacy opcodes that manipulate only the arithmetic flag register and have no other integer register destination may be treated differently than instructions that write both integer and flag registers while still fitting within the VEX prefix framework. Predication implies flag non-modification for instructions which update integer registers but predication does not need to imply flag non-modification for those x86 instructions that update only arithmetic flags. CMP instruction could allow a conditional execution encoding. For these instructions, the predicate applies to the flag modification itself allowing a predicated TRUE instruction to update the arithmetic flags and a predicated FALSE instruction to not update the flags.

Figure 8:
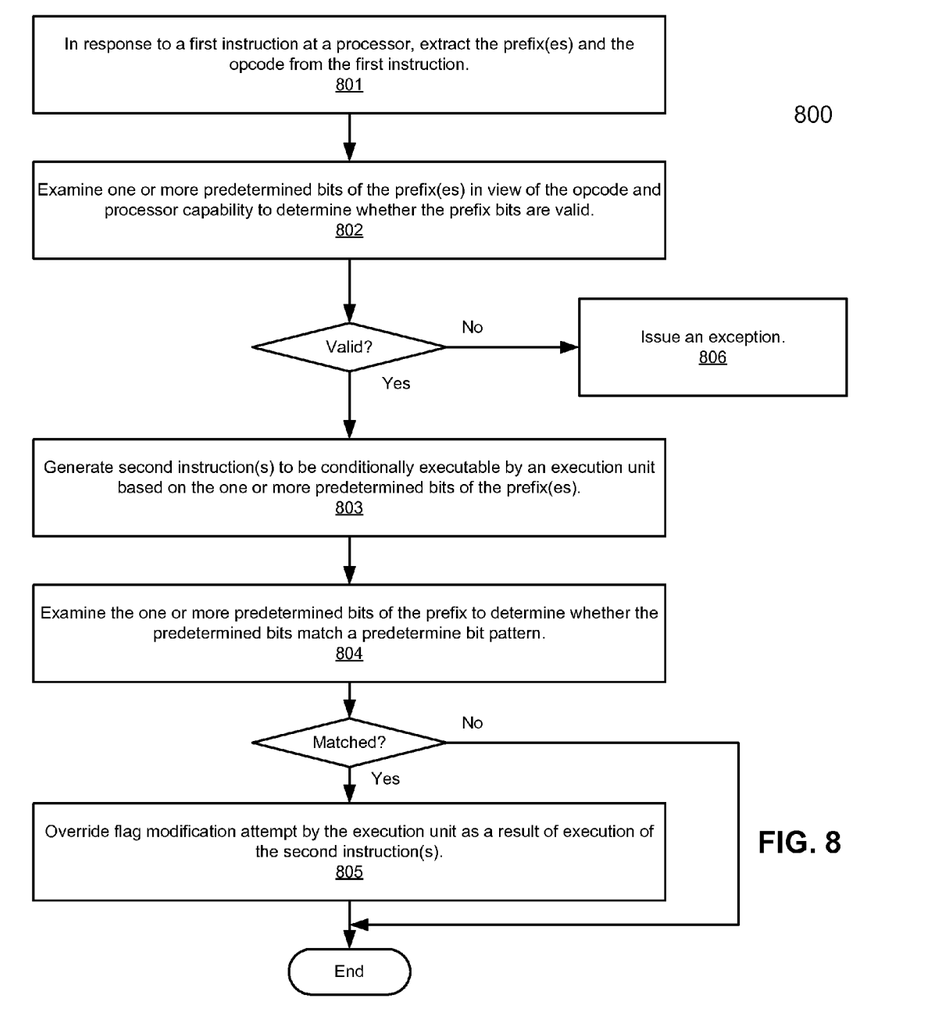
FIG. 8 is a flow diagram illustrating a method to process instructions according to one embodiment.

FIG. 8 is a flow diagram illustrating a method to process instructions according to one embodiment. For example, method 800 may be performed by instruction decoder 101 of FIG. 1. Referring to FIG. 8, at block 801, in response to a first instruction received at a processor, prefix and opcode are extracted from the first instructions. At block 802, processing logic is to examine one or more bits of the prefix in view of the opcode and capability of the processor (e.g., CPUID) to determine whether the prefix bits are valid. If not, at block 806, an exception is generated. If the prefix or the first instruction is valid, at block 803, processing logic generates a second instruction (e.g., one or more microcode operations or microinstructions) to be conditionally executable by an execution unit based on one or more conditions determined based on the prefix. At block 804, processing logic examines one or more bits of the prefix to determine whether the bits match a predetermined bit pattern. If so, at block 805, processing logic overrides an attempt by an execution unit to modify a flag as a result of execution of the microcode operations or microinstructions.

Figure 9:
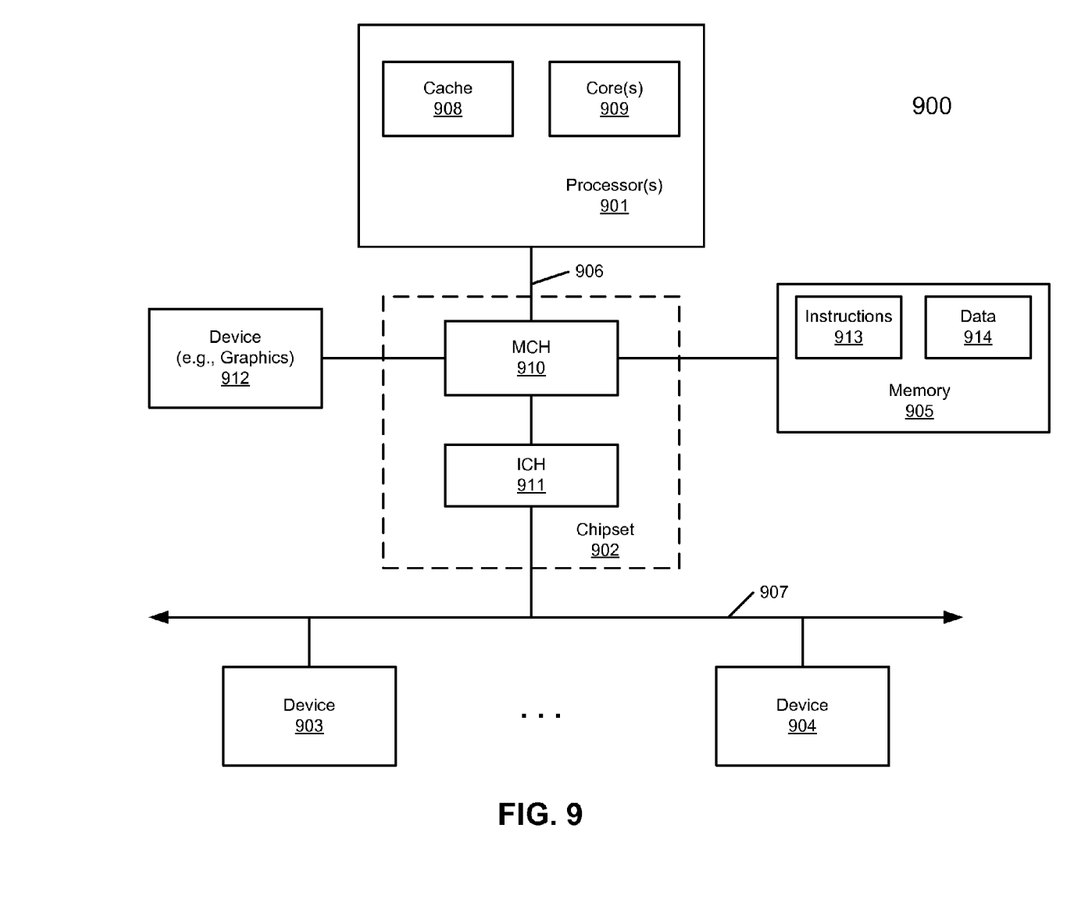
FIG. 9 is a block diagram illustrating an example of a data processing system according to one embodiment.

FIG. 9 is a block diagram illustrating an example of a data processing system according to one embodiment of the invention. Processor 901 of system 900 may represent processor 100 of FIG. 1 as described above. System 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 9 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 9, in one embodiment, system 900 includes processor 901 and chipset 902 to couple various components to processor 901 including memory 905 and devices 903-904 via a bus or an interconnect. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. For example, processor 901 may be a Pentium® 4, Pentium® Dual-Core, Core™ 2 Duo and Quad, Xeon™, Itanium™, XScale™, Core™ i7, Core™ i5, Celeron®, or StrongARM™ microprocessor available from Intel Corporation of Santa Clara, Calif. Processor 901 is configured to execute instructions for performing the operations and steps discussed herein.

Processor 901 may include an instruction decoder, which may receive and decode a variety of instructions. The decoder may generate and output one or more micro-operations, micro-code entry points, microinstructions, other instructions, or other control signals, which reflect, or are derived from, an original input instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder may not be a required component of processor 901. In one or more other embodiments, processor 901 may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Processor 901 and/or cores 909 may further include one or more execution units coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit. Processor 901 and/or cores 909 may further include multiple different types of execution units, such as, for example, arithmetic units, arithmetic logic units (ALUs), integer units, etc.

Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

Processor 901 and/or cores 909 may also optionally include one or more other well-known components. For example, processor 901 may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or a combination thereof.

Figure 10:
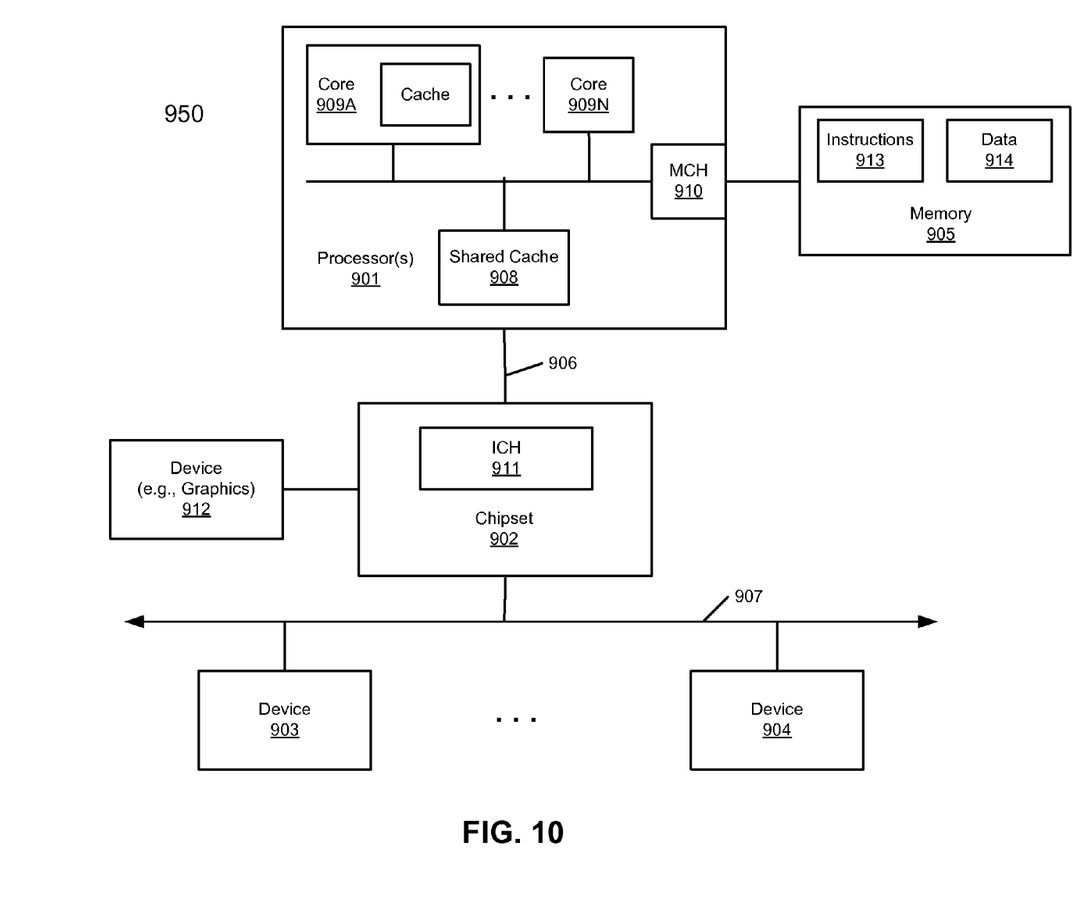
FIG. 10 is a block diagram illustrating an example of a data processing system according to another embodiment.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown in FIG. 10. Furthermore, graphics accelerator 912 may be integrated within MCH 910 or processor 901.

Memory 905 may store data including sequences of instructions that are executed by processor 901, or any other device. For example, executable code 913 and/or data 914 of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces. Bus 906 may be implemented as a variety of buses or interconnects, such as, for example, a quick path interconnect (QPI), a hyper transport interconnect, or a bus compatible with advanced microcontroller bus architecture (AMBA) such as an AMBA high-performance bus (AHB).

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Cache 908 may be shared amongst cores 909. Alternatively, at least one of cores 909 further includes its own local cache (e.g., caches 908A-908N) embedded therein. At least one of cores 909 may utilize both the local cache and the cache shared with another one of cores 909. Processor 901 may further include a direct cache access (DCA) logic to enable other devices such as devices 903-904 to directly access cache 908. Processor 901 and/or chipset 902 may further include an interrupt controller, such as an advanced programmable interrupt controller (APIC), to handle interrupts such as message signaled interrupts.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
an instruction decoder to receive a first instruction having a prefix and an opcode and to generate, by the instruction decoder of the processor, a second instruction executable based on a condition determined based on a vector length bit and three other bits of the prefix that are not utilized in a vector instruction; and
an execution unit to conditionally execute the second instruction based on the condition determined based on the prefix.

2. The processor of claim 1, further comprising a prefix-condition table to convert a plurality of prefixes to a plurality of conditions, wherein the instruction decoder is to perform a lookup operation in the prefix-condition table to translate the prefix to the condition.

3. The processor of claim 1, wherein the execution unit is to examine a flag register of the processor based on the condition to determine whether one or more flags of the flag register satisfy the condition derived from the prefix to execute the second instruction.

4. The processor of claim 1, further comprising flag modification override logic to prevent the execution unit from modifying a flag register of the processor based on the prefix of the first instruction.

5. The processor of claim 1, wherein the instruction decoder is to:
extract the prefix from the first instruction,
determine whether the first instruction is valid based on the prefix in view of a capability of the processor, wherein the execution unit is to execute the first instruction only if the first instruction is valid, and
generate an exception indicating that the first instruction is invalid, if one or more bits of the prefix matches a predetermined bit pattern based on the capability of the processor.

6. The processor of claim 5, wherein in determining whether the first instruction is valid, the instruction decoder is to examine a value of one or more bits of the prefix in view of a processor identifier that identifies a type of the processor.

7. The processor of claim 1, wherein flag modification logic is to:
prevent the execution unit from modifying a flag register if one or more bits of the prefix match a first predetermined bit pattern, and
allow the execution unit to modify the flag register if one or more bits of the prefix match a second predetermined bit pattern.

8. A method, comprising:
receiving, at a processor, first instruction having a prefix and an opcode;
generating, by an instruction decoder of the processor, a second instruction executable based on a condition determined based on a vector length bit and three other bits of the prefix that are not utilized in a vector instruction; and
conditionally executing, by an execution unit of the processor, the second instruction based on the condition determined based on the prefix.

9. The method of claim 8, wherein generating a second instruction comprises performing a lookup operation in a prefix-condition table to translate the prefix to the condition.

10. The method of claim 8, wherein conditionally executing the second instruction comprises examining a flag register of the processor based on the condition to determine whether one or more flags of the flag register satisfy the condition derived from the prefix to execute the second instruction.

11. The method of claim 8, further comprising preventing the execution unit from modifying a flag register of the processor based on the prefix of the first instruction.

12. The method of claim 8, further comprising:
extracting the prefix from the first instruction;
determining whether the first instruction is valid based on the prefix in view of a capability of the processor, wherein the execution unit is to execute the first instruction only if the first instruction is valid; and
generating an exception indicating that the first instruction is invalid, if one or more bits of the prefix matches a predetermined bit pattern based on the capability of the processor.

13. The method of claim 12, wherein determining whether the first instruction is valid comprises examining a value of one or more bits of the prefix in view of a processor identifier that identifies a type of the processor.

14. The method of claim 8, further comprising:
preventing the execution unit from modifying a flag register if one or more bits of the prefix match a first predetermined bit pattern; and
allowing the execution unit to modify the flag register if one or more bits of the prefix match a second predetermined bit pattern.

15. A system, comprising:
an interconnect;
a processor coupled the interconnect to receive by an instruction decoder of the processor a first instruction having a prefix and an opcode, and to generate, a second instruction executable based on a condition determined based on a vector length bit and three other bits of the prefix that are not utilized in a vector instruction, and to cause an execution unit to conditionally execute the second instruction based on the condition determined based on the prefix; and
a dynamic random access memory (DRAM) coupled to the interconnect.

16. The system of claim 15, wherein the processor further comprises a prefix-condition table to convert a plurality of prefixes to a plurality of conditions, wherein the instruction decoder is to perform a lookup operation in the prefix-condition table to translate the prefix to the condition.

17. The system of claim 15, wherein the processor is to examine a flag register of the processor based on the condition to determine whether one or more flags of the flag register satisfy the condition derived from the prefix to execute the second instruction.

18. The system of claim 15, wherein the processor further comprises flag modification override logic to prevent the execution unit from modifying a flag register of the processor based on the prefix of the first instruction.

* * * * *